US008555470B2

(12) United States Patent
Spataro et al.

(10) Patent No.: US 8,555,470 B2
(45) Date of Patent: Oct. 15, 2013

(54) MAGNETIC CARABINER SYSTEM

(75) Inventors: Joseph Edward Spataro, Cottonwood Heights, UT (US); Ben Walker, Draper, UT (US); William R Belcourt, Salt Lake City, UT (US)

(73) Assignee: Black Diamond Equipment, Ltd., Salt Lake City, UT (US)

( * ) Notice: Subject to any disclaimer, the term of this patent is extended or adjusted under 35 U.S.C. 154(b) by 34 days.

(21) Appl. No.: 13/114,401

(22) Filed: May 24, 2011

(65) Prior Publication Data

US 2012/0297590 A1    Nov. 29, 2012

(51) Int. Cl.
*F16B 45/02*    (2006.01)
*A44B 13/02*    (2006.01)

(52) U.S. Cl.
USPC .......... 24/599.9; 24/303; 24/599.5; 24/600.1; 24/265 H; 294/82.2

(58) Field of Classification Search
USPC ............... 24/303, 599.9, 599.1, 599.5, 600.1, 24/265 H; 294/82.19, 82.2
See application file for complete search history.

(56) References Cited

U.S. PATENT DOCUMENTS

| 389,037 | A | | 9/1888 | Ernest |
|---|---|---|---|---|
| 5,292,165 | A | * | 3/1994 | Wiklund ..................... 294/82.33 |
| 5,463,798 | A | | 11/1995 | Wurzer |
| 5,505,013 | A | | 4/1996 | Gois |
| 5,608,953 | A | | 3/1997 | Petzl et al. |
| 5,791,025 | A | | 8/1998 | Maurice et al. |
| 6,227,015 | B1 | | 5/2001 | Luquire |
| 6,588,076 | B1 | | 7/2003 | Choate |
| 7,320,159 | B2 | | 1/2008 | Petzl et al. |
| 7,926,152 | B2 | * | 4/2011 | Emenheiser ..................... 24/303 |
| 8,016,073 | B2 | * | 9/2011 | Petzl et al. ......................... 182/3 |
| 2006/0219479 | A1 | | 10/2006 | Petzl et al. |
| 2008/0250615 | A1 | * | 10/2008 | Emenheiser ................. 24/599.5 |
| 2012/0060332 | A1 | * | 3/2012 | Mitchell ..................... 24/592.1 |

FOREIGN PATENT DOCUMENTS

| EP | 0466613 | | 1/1992 |
|---|---|---|---|
| EP | 0561751 | | 9/1993 |
| EP | 2397708 | | 12/2011 |
| EP | 2479443 A1 | * | 7/2012 |

* cited by examiner

*Primary Examiner* — Robert J Sandy
*Assistant Examiner* — Michael Lee
(74) *Attorney, Agent, or Firm* — Trent Baker; Baker & Associates PLLC

(57) ABSTRACT

One embodiment of the present invention relates to an automatic locking carabiner including a frame, a gate, a gate biasing system, and a gate locking system. The gate is pivotably coupled to the frame including a closed configuration within which the gate and frame form a continuously enclosed inner region, and an open configuration within which the gate is pivotably rotated within the inner region so as to form an opening. The gate locking system includes an engaged state within which the gate is locked in the closed configuration, and a disengaged state within which the gate is pivotably rotatable with respect to the frame. The gate locking system is biased toward the engaged state when the gate is in the closed configuration. The functionality and operation of the gate locking system is independent of the gate biasing system. The engaged state of the gate locking system includes a releasable magnetic coupling between the gate and the frame.

20 Claims, 2 Drawing Sheets

MAGNETIC CARABINER SYSTEM

FIELD OF THE INVENTION

The invention generally relates to automatic locking carabiner systems. In particular, the present invention relates to an automatic magnetic carabiner gate locking system.

BACKGROUND OF THE INVENTION

Carabiners, snap-hooks, and releasable clamps are used in a variety of applications for releasably coupling objects to one another. For example, a rock climber may use one or more carabiners to releasably secure a rope to a protection device during vertical ascension. Carabiners generally include a frame, a gate, and a releasable gate closure mechanism. The gate is configured to releasably engage the frame, so as to form a continuous inner region which can be used to mechanically couple to one or more objects. The releasable gate closure mechanism is configured to allow the gate to be selectively pivoted with respect to the frame in order to facilitate adding or removing items from the continuous inner region. The releasable gate closure mechanism simultaneously biases the gate toward a closed configuration with respect to the frame, so as to maintain mechanical coupling of items within the continuous inner region. A wide variety of frame, gate, and biasing systems exist to specifically accommodate particular applications and/or manufacturing costs for the carabiner.

Various specialized carabiners are configured for particular applications. One type of specialized carabiner is referred to as a "locking carabiner" and includes a locking mechanism configured to selectively obstruct the gate from opening while in a locked configuration. An automatic locking mechanism may be automatically biased toward the locked configuration with respect to the unlocked configuration. The locked configuration prevents the gate from pivoting with respect to the frame. In contrast, the unlocked configuration allows the gate to pivot against the frame in response to a force. The selective or automatic engagement of the locked configuration thereby eliminates or reduces inadvertent or accidental opening of the gate with respect to the frame. Therefore, to open or pivot the gate of a locking carabiner, a user must first disengage the locking mechanism and subsequently apply an appropriate force to open the gate. The method by which the user disengages the locking mechanism is dependent on the type of locking mechanism.

Conventional automatic locking mechanisms require complex physical gestures to initiate and/or maintain the disengaged state of the locking mechanism. For example, many locking mechanisms include a biased rotational locking mechanism positioned on the gate. A user must simultaneously rotate the locking mechanism while opening the gate to disengage the locking mechanism. Unfortunately, the rotational force to unlock this type of locking mechanism may also be inadvertently applied via translational surface friction, resulting in potential accidental gate opening during use. In addition, conventional locking mechanisms include numerous parts which must be properly manufactured and assembled, thereby decreasing their reliability and manufacturing efficiency.

Therefore, there is a need in the industry for an automatic locking carabiner system that is optimized for user operation, manufacturing efficiency, and operational reliability.

SUMMARY OF THE INVENTION

The invention generally relates to automatic locking carabiner systems. One embodiment of the present invention relates to an automatic locking carabiner system including a frame, a gate, a gate biasing system, and a gate locking system. The gate is pivotably coupled to the frame, including a closed configuration within which the gate and frame form a continuously enclosed inner region and an open configuration within which the gate is pivotably rotated within the inner region so as to form an opening. The gate biasing system biases the gate toward the closed configuration. The gate locking system includes an engaged state within which the gate is locked in the closed configuration, and a disengaged state within which the gate is pivotably rotatable with respect to the frame. The gate locking system is biased toward the engaged state when the gate is at or substantially near the closed configuration. The functionality and operation of the gate locking system is independent of the gate biasing system. The engaged state of the gate locking system includes a releasable magnetic coupling between the gate and the frame. A second embodiment of the present invention includes two independent locking systems. A third embodiment of the present invention includes the act of biasing the gate locking system toward the disengaged state when the gate is in the open configuration.

Embodiments of the present invention represent a significant advance in the field of automatic locking carabiners. Conventional automatic locking carabiner systems include spring biased locking mechanisms that are both cumbersome and inefficient to manufacture. Many conventional automatic locking carabiner systems respond to a rotational force to switch between the locked and unlocked states of the locking system. Unfortunately, this rotational force can inadvertently occur in certain translation friction circumstances resulting in an undesired engagement of the unlocked state. In addition, many automatic locking carabiner systems are dependent on the gate biasing system. Likewise, many automatic locking carabiner systems are singular. Embodiments of the present invention overcome these and many other limitations of conventional automatic locking carabiner systems. Embodiments of the present invention may include a magnetic coupling between the gate and frame to engage the locked/engaged state of the locking system. Embodiments of the present invention may include two independent locking systems that function independently so as to ensure proper functionality. Embodiments of the present invention include a locking system that features two pivoting members that respond to a pinching force to switch between the locked/engaged and unlocked/disengaged states of the locking system.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

The following description of the invention can be understood in light of the Figures, which illustrate specific aspects of the invention and are a part of the specification. Together with the following description, the Figures demonstrate and explain the principles of the invention. In the Figures, the physical dimensions may be exaggerated for clarity. The same reference numerals in different drawings represent the same element, and thus their descriptions will be omitted.

DETAILED DESCRIPTION OF THE INVENTION

Figure 1A:
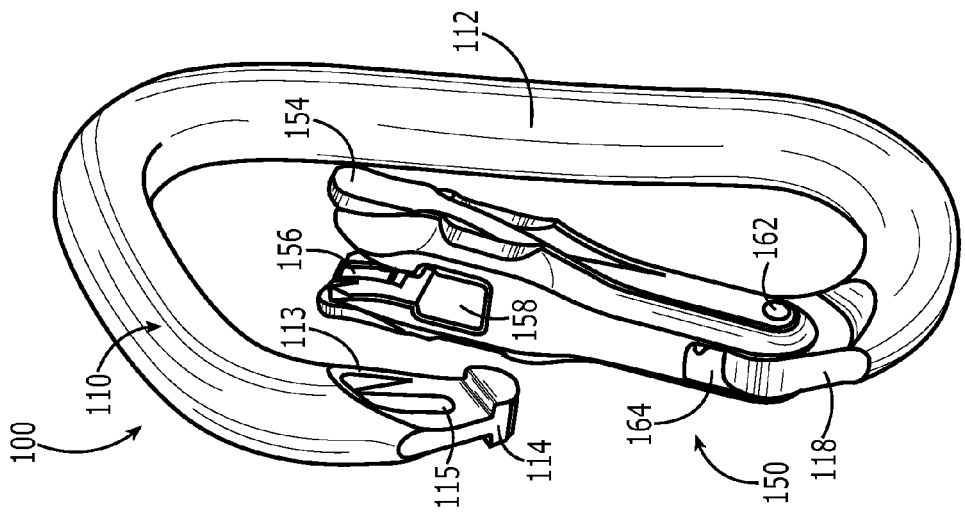
FIG. 1A illustrates a perspective view of an automatic locking carabiner system including the closed configuration of the gate and the engaged state of the locking system in accordance with embodiments of the present invention.
Figure 1B:
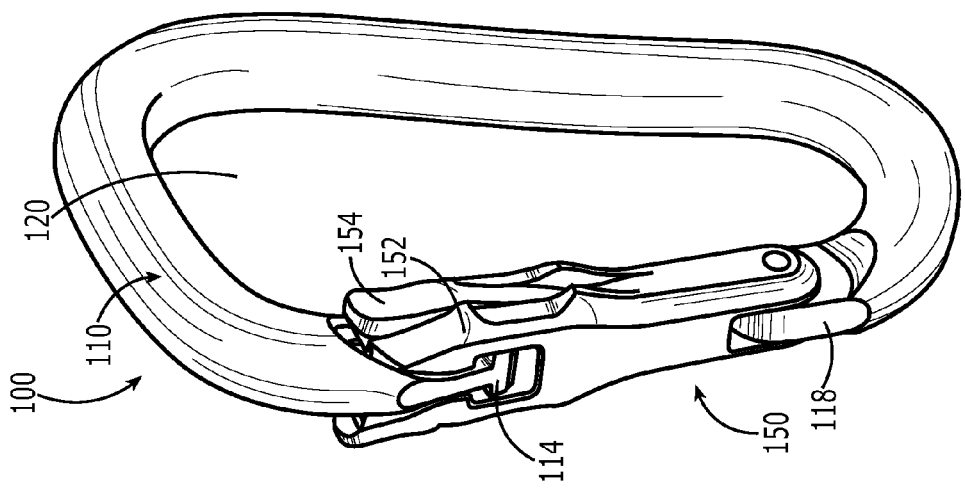
FIG. 1B illustrates a perspective view of the automatic locking carabiner system of FIG. 1A including the closed configuration of the gate and the disengaged state of the locking system in accordance with embodiments of the present invention.

The invention generally relates to automatic locking carabiner systems. One embodiment of the present invention relates to an automatic locking carabiner system including a frame, a gate, a gate biasing system, and a gate locking system. The gate is pivotably coupled to the frame, including a closed configuration within which the gate and frame form a continuously enclosed inner region and an open configuration within which the gate is pivotably rotated within the inner region so as to form an opening. The gate biasing system biases the gate toward the closed configuration. The gate locking system includes an engaged state within which the gate is locked in the closed configuration, and a disengaged state within which the gate is pivotably rotatable with respect to the frame. The gate locking system is biased toward the engaged state when the gate is at or substantially near the closed configuration. The functionality and operation of the gate locking system is independent of the gate biasing system. The engaged state of the gate locking system includes a releasable magnetic coupling between the gate and the frame. A second embodiment of the present invention includes two independent locking systems. A third embodiment of the present invention includes the act of biasing the gate locking system toward the disengaged state when the gate is in the open configuration.

Also, while embodiments are described in reference to an automatic locking carabiner system including a magnetic coupling, it will be appreciated that the teachings of the present invention are applicable to other areas including but not limited to other types of carabiners.

The following terms will be defined as follows:

Automatic locking carabiner system—a carabiner including a locking mechanism that automatically engages corresponding to a closed configuration of the gate with respect to the frame. Therefore, as the gate biasing system of the gate forces the gate toward the closed configuration, a locking system will automatically engage, thereby preventing the gate from pivoting back toward the open configuration.

Biasing system—a system that urges toward a particular state or configuration. For example, a gate biasing system on a carabiner exerts a biasing force toward the closed configuration of the gate with respect to the frame.

Pivoting member—a lengthwise member configured to pivot about a pivot point. For example, a playground see-saw machine pivots about a central pivot point in which the elevation of each lengthwise side corresponds to the opposite side.

Magnetic coupling—a coupling between two oppositely charged magnetic members. A magnetic attraction force generally creates a releasable coupling, Reference is made to FIGS. 1A-C and 2A-C, which illustrate an automatic locking carabiner system with particular states/configurations of operation, designated generally at 100. The system 100 includes a frame 110, a gate 150. The frame 110 includes a structure 112 extending around a gap or opening across which the gate 150 extends in the closed configuration. The structure 112 of the frame may be substantially hollow and composed of an aluminum material. The region of the frame 110 adjacent to the top end of the opening may be referred to as the nose. The nose region of the frame 110 further includes a notch 114 and a pillar 116. The pillar 116 is an elongated narrow profile region coupling the notch 114 to the structure 112 of the frame 110. The notch 114 is substantially wider than the pillar 116. The frame 110 further includes a frame magnetic member 115 (FIG. 1C) disposed within the pillar 116 and configured to be externally exposed on either side of the pillar 116 (one side visible in FIG. 1C). The frame magnetic member 115 may be disposed substantially within the three dimensional region of the pillar 116 to minimize debris and maximize reliable operation. The composition of the frame magnetic member 115 may include iron. In accordance with alternative embodiments, the frame magnetic member 115 may also be two frame magnetic members separated by a non-magnetic structure. The frame 110 further includes locking walls 113 (FIG. 1C) disposed along an internal region of each side of the pillar 116. The locking walls 113 extend laterally from the pillar 116 to enable a locking engagement with a corresponding structure of the gate. The illustrated locking walls 113 include an angle corresponding to a structure between the narrow pillar 116 region and the wider structure 112 region. The angular configuration of the locking walls 113 enables a portion of the gate 150 to pivot over the locking walls 113 and enables a portion of the gate 150 to obstruct against the locking walls 113 in the engaged state of the locking system. The opposite lengthwise end of the structure 112 may be referred to as the gate coupling region 118. The gate coupling region includes a narrow region around which the gate 150 may be rotatably/pivotably coupled. For example, some form of coupling member may extend through the gate 150 and the gate coupling region 118, thereby creating the pivot point 162 between the gate 150 and the frame 110.

Figure 2C:
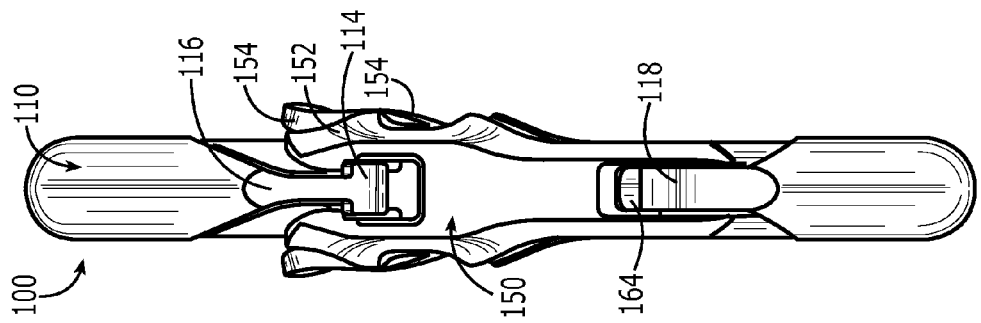
FIG. 2C illustrates a profile view of the automatic locking carabiner system of FIG. 1A including the open configuration of the gate and the disengaged state of the locking system in accordance with embodiments of the present invention.
Figure 2B:
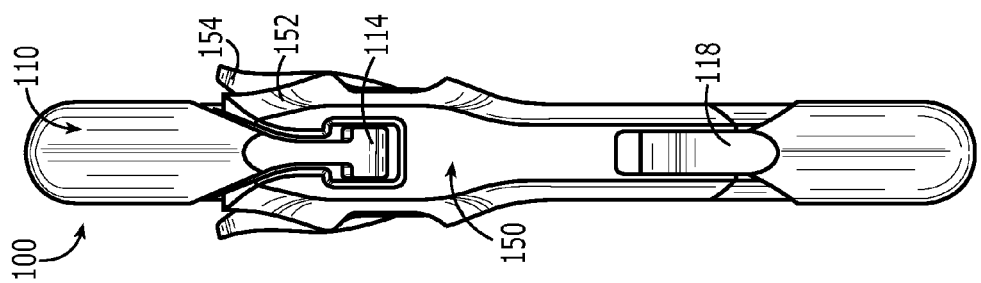
FIG. 2B illustrates a profile view of the automatic locking carabiner system of FIG. 1A including the closed configuration of the gate and the disengaged state of the locking system in accordance with embodiments of the present invention.
Figure 2A:
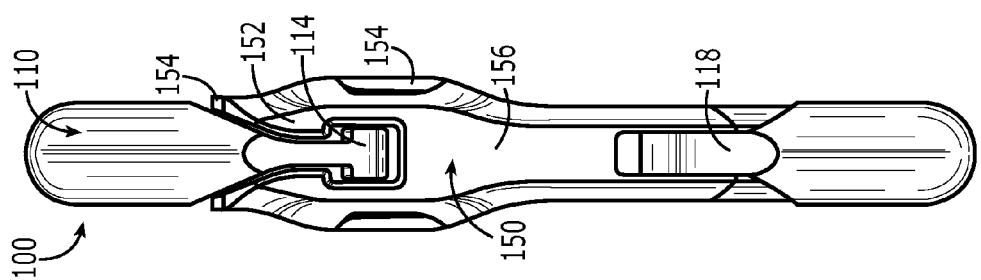
FIG. 2A illustrates a profile view of the automatic locking carabiner system of FIG. 1A including the closed configuration of the gate and the engaged state of the locking system in accordance with embodiments of the present invention.

The gate 150 includes an elongated gate structure 152 which corresponds to the opening in the frame 110. One lengthwise side of the gate structure 152 further includes a notch recess 158 and a channel. The notch recess 158 and channel are shaped and oriented in a manner to provide a female keyed coupling with the notch 114 and pillar 116 of the frame 110. The gate structure 150 further includes two pivoting members 154 disposed within corresponding recesses. The pivoting members 154 each include an upper region, a pivot point, and a lower region. The pivoting members 154 are pivotably coupled to the gate structure 152 at the pivot point between the upper and lower regions respectively. The pivoting members 154 are configured to internally pivot with respect to the gate structure 152. The pivot point of the pivoting members 154 may be distal of the notch recess 158. The upper and lower regions of the pivoting members 154 may be substantially disposed within and aligned with the three dimensional shape of the gate structure 152 in the engaged state of the locking system (FIGS. 1A and 2A). The gate structure 152 may further include a set of pinching recesses oriented in lengthwise alignment with the lower portion of the pivoting members 154 to facilitate efficient user operation. A gate magnetic member 156 is disposed on the internal surfaces of the upper regions of the two pivoting members 154. The gate magnetic members 156 may be composed of a magnetic material having a magnetic charge opposite of the frame magnetic member 115. The gate magnetic members 156 may be disposed within the three dimensional structure of the upper portion of the pivoting members 154.

Figure 1C:
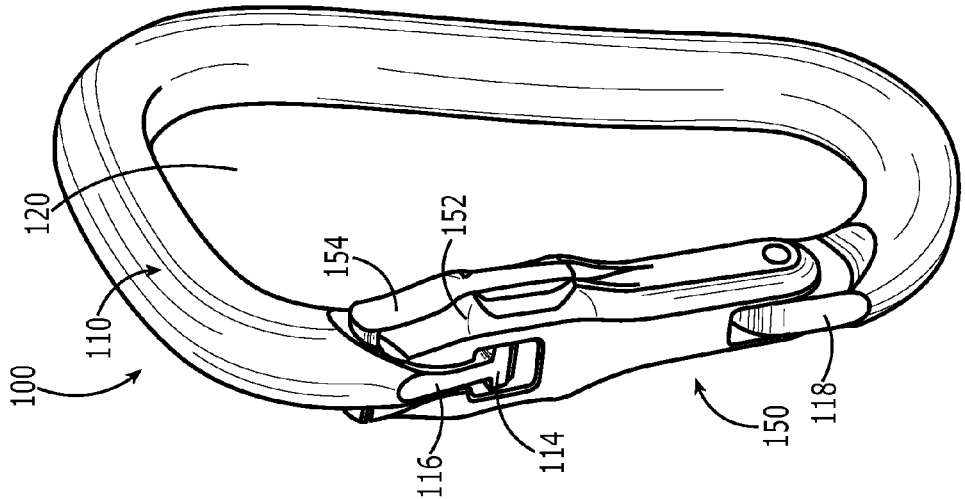
FIG. 1C illustrates a perspective view of the automatic locking carabiner system of FIG. 1A including the open configuration of the gate and the disengaged state of the locking system in accordance with embodiments of the present invention.

The gate 150 is pivotably or rotatably coupled to the frame 110 about the gate pivot point 162 (FIG. 1C). The structure of the gate 150 and frame 110 is configured to enable the gate 150 to pivot and/or rotate between a closed configuration (FIG. 1A, 2A, 1B, 2B) and an open configuration (FIG. 1C, 2C). The closed configuration of the gate 150 with respect to the frame 110 forms a continuously enclosed inner region 120. The open configuration of the gate 150 with respect to the frame 110 includes the gate pivotably rotated within the inner region 120, thereby forming a two dimensional opening between the gate 150 and frame 110. The open configuration includes the entire pivotal range between the closed configuration and the full pivotal rotation of the gate 150 with respect to the frame 110.

The gate 150 further includes a gate biasing system (not shown) between the frame 110 and gate 150. The gate biasing system biasing the gate 150 toward the closed configuration with respect to the frame 110. The illustrated embodiment includes a gate biasing system with an internal compression spring coupled within the illustrated lower lengthwise end of the gate 150. As the gate 150 pivots toward the open configuration, the internal compression spring is compressed and exerts a biasing force upon the gate 150 toward the closed configuration.

The gate 150 further includes a gate locking system between the frame 110 and gate 150. The gate locking system includes an engaged state within which the gate 150 is locked in the closed configuration, and a disengaged state within which the gate 150 is pivotably rotatable with respect to frame. The gate locking system may include various components of the gate 150 and frame 110 configured to provide the locking system functions. The operation of the illustrated gate locking system corresponds to the pivotal position of the pivoting members 154 with respect to the locking walls 113 of the frame 110. Therefore, the illustrated system 100 includes two independent locking systems corresponding to the operation of each of the pivoting members 154.

The pivoting members 154 may be pivoted with respect to the gate structure 152, so as to form a pinched state (FIGS. 1A, 2A) corresponding to the engaged state of the locking system or an expended state (FIGS. 1B, 2B, 1C, 2C) corresponding to the disengaged state of the locking system. The pinched state includes the upper portion of the pivoting members 154 pivoting toward one another and the nose region of the frame 110. The pinched state also corresponds to the upper portion of the pivoting members 154 disposed substantially within a recess of the gate structure 152. The pinched state further corresponds to the lower portion of the pivoting members 154 disposed partially external to a set of pinch recesses in the gate structure 152. The pinched state further includes the upper portion of the pivoting members 154 pivoting toward one another such that the upper portions are separated by a space less than the width of the locking walls 113. Therefore, the locking walls 113 obstruct the pivoting or rotating of the entire gate 150 because the pivoting members 154 are obstructed from pivoting or rotating by the locking walls 113.

The expanded state of the pivoting members 154 includes the upper portion of the pivoting members 154 pivoted away from one another a particular distance and the lower portions of the pivoting members 154 pivoted toward one another. The expanded configuration pivots the upper portion of the pivoting members 154 wider than the locking walls 113 of the frame 110, thereby allowing the gate 150 to pivot with respect to the frame 110. The illustrated system 100 includes two pivoting members 154, but it will be appreciated that alternatively only one pivoting member 154 may be utilized for a locking system in accordance with embodiments of the present invention.

The pinched state of the pivot members 154 includes a releasable magnetic coupling between the gate magnetic members 156 and the frame magnetic member 115. The gate magnetic members 156 are oppositely magnetically charged from the frame magnetic member 115. Likewise, the gate magnetic members 156 are commonly magnetically charged. The releasable magnetic coupling includes an automatically generated magnetic attraction force when the gate 150 is pivoted at least ninety percent from the open configuration toward the closed configuration. The releasable magnetic coupling thereby automatically biases the locking system toward the engaged state when the gate is pivoted at least ninety percent toward the closed configuration. The locking system and the pivotal operation of the pivoting members 154 with respect to the frame are independent of the gate biasing system disposed on the opposite lengthwise side of the gate 150. The strength of the magnetic coupling force between the frame magnetic member 115 and the gate magnetic members 156 depends on the size, composition, and charge of the corresponding magnetic materials and may thereby be adjusted according to particular functionalities in accordance with embodiments of the present invention.

When the gate is pivoted to the open configuration, the magnetic gate members 156 may generate an automatic oppositional, expansion, or separational force upon the pivot members 154, thereby biasing the pivoting members 154 away from one another and toward the expanded state of the locking system. The magnetic members 156 may include commonly charged magnetic members that automatically repel one another, generating the opposition or repelling force. The locking system therefore automatically times or correlates the position of the gate (i.e. open or closed) with the biasing of the locking system (i.e. position of the pivoting members). The automatic opposition force between the pivoting members 154 may be engaged when the gate is pivoted at least ten percent toward the open configuration from the closed configuration.

It should be noted that various alternative system designs may be practiced in accordance with the present invention, including one or more portions or concepts of the embodiment illustrated in FIG. 1 or described above. Various other embodiments have been contemplated, including combinations in whole or in part of the embodiments described above.

What is claimed is:

1. An automatic locking carabiner system comprising:
   a frame;
   a gate pivotably coupled to the frame, including a closed configuration within which the gate and frame form a continuously enclosed inner region, and an open configuration within which the gate is pivotably rotated within the inner region to form an opening;

a gate biasing system coupled to the frame and gate, biasing the gate toward the closed configuration with respect to the frame;

a gate locking system coupled to the frame and gate, wherein the gate locking system includes an engaged state within which the gate is locked in the closed configuration, and a disengaged state within which the gate is pivotably rotatable with respect to the frame; and wherein, the gate locking system is biased toward the engaged state corresponding to the closed configuration of the gate, and wherein the gate locking system is independent of the gate biasing system, and wherein the engaged state corresponds to a releasable magnetic coupling between the gate and the frame.

2. The carabiner of claim 1, wherein the gate locking system includes two independent locking mechanisms.

3. The carabiner of claim 1, wherein the gate locking system is biased toward the disengaged state corresponding to the open configuration of the gate.

4. The carabiner of claim 1, wherein the releasable magnetic coupling is between a magnetic frame member and at least one magnetic gate member.

5. The carabiner of claim 1, wherein the gate locking system includes two pivoting members configured to pivot substantially parallel to the gate, and wherein the pivoting members include a pinched configuration and an expanded configuration, and wherein the frame includes a locking wall configured to obstruct the pivotal rotation of the gate corresponding to the pinched configuration of the pivoting members.

6. The carabiner of claim 1, wherein the gate locking system includes two pivoting members configured to oppositely pivot with respect to the gate, and wherein the releasable magnetic coupling is between a magnetic frame member and a magnetic gate member disposed on both of the pivoting members.

7. The carabiner of claim 1, wherein the gate locking system includes two pivoting members configured to pivot substantially parallel to the gate, and wherein the releasable magnetic coupling is between a magnetic frame member and a magnetic gate member disposed on both of the pivoting members, and wherein the magnetic gate members are magnetically charged opposite of the magnetic frame member, and wherein the magnetic gate members are magnetically charged the same.

8. The carabiner of claim 7, wherein a magnetic opposition forces between the magnetic gate members biases the two pivoting members toward the expanded configuration corresponding to at least a 10 percent pivot of the gate with respect to the frame toward the open configuration.

9. The carabiner of claim 7, wherein a magnetic attraction forces between the magnetic gate members and the magnetic frame member biases the two pivoting members toward the pinched configuration corresponding to at least a 90 percent pivot of the gate with respect to the frame toward the closed configuration.

10. The carabiner of claim 1, wherein the releasable magnetic coupling is automatically engaged corresponding to at least a 90 percent pivot of the gate with respect to the frame toward the closed configuration.

11. The carabiner of claim 1, wherein the gate includes a notch recess and a channel, and wherein the frame includes a notch and pillar, and wherein the closed configuration of the gate corresponds to a keyed engagement between the gate and the frame further including the notch and pillar disposed within the notch recess and channel respectively.

12. The carabiner of claim 1, wherein the gate biasing system and the gate locking system are substantially disposed on opposite lengthwise ends of the gate.

13. The carabiner of claim 1, wherein the gate locking system includes two pivoting members configured to oppositely pivot with respect to the gate, and wherein the two pivoting members include an upper region, a pivot point, and a lower region, and wherein the upper region is disposed at a lengthwise end of the gate, and wherein the pivot point is disposed between the upper and lower regions.

14. The carabiner of claim 13, wherein the two pivoting members are configured to internally pivot within opposite recesses in the gate.

15. The carabiner of claim 13, wherein the gate includes a notch recess and a channel, and wherein the pivot point of the two pivoting members is lengthwise disposed distal of the notch recess with respect to the gate.

16. The carabiner of claim 13, wherein the gate further includes a set of pinch recesses adjacent to the lower regions of the two pivoting members.

17. The carabiner of claim 1, wherein the gate biasing system includes an internal spring.

18. The carabiner of claim 1, wherein the engaged state of the locking system includes a physical obstruction between at least one pivoting member disposed on the gate and a locking wall disposed on the frame.

19. An automatic locking carabiner system comprising:
a frame;
a gate pivotably coupled to the frame, including a closed configuration within which the gate and frame form a continuously enclosed inner region, and an open configuration within which the gate is pivotably rotated within the inner region to form an opening;
a gate biasing system coupled to the frame and gate, biasing the gate toward the closed configuration with respect to the frame;
a gate locking system coupled to the frame and gate, wherein the gate locking system includes an engaged state within which the gate is locked in the closed configuration, and a disengaged state within which the gate is pivotably rotatable with respect to the frame; and
wherein, the gate locking system is biased toward the engaged state corresponding to the closed configuration of the gate, and wherein the gate locking system includes two independent locking mechanisms, and wherein the engaged state corresponds to a releasable magnetic coupling between the gate and the frame.

20. An automatic locking carabiner system comprising:
a frame;
a gate pivotably coupled to the frame, including a closed configuration within which the gate and frame form a continuously enclosed inner region, and an open configuration within which the gate is pivotably rotated within the inner region to form an opening;
a gate biasing system coupled to the frame and gate, biasing the gate toward the closed configuration with respect to the frame;
a gate locking system coupled to the frame and gate, wherein the gate locking system includes an engaged state within which the gate is locked in the closed configuration, and a disengaged state within which the gate is pivotably rotatable with respect to the frame; and
wherein, the gate locking system is biased toward the engaged state corresponding to the closed configuration of the gate, and wherein the gate locking system is independent of the gate biasing system, and wherein the gate locking system is biased toward the disengaged state corresponding to the open configuration of the gate.

* * * * *